(12) United States Patent
Kwon et al.

(10) Patent No.: US 8,989,078 B2
(45) Date of Patent: Mar. 24, 2015

(54) METHOD AND APPARATUS FOR SETTING UP A RELAY LINK IN A WIRELESS COMMUNICATION SYSTEM

(75) Inventors: Hyoung-Jin Kwon, Cheongju-si (KR); Sung-Geun Jin, Daejeon (KR); Kapseok Chang, Daejeon (KR); Woo-Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 92 days.

(21) Appl. No.: 13/498,911

(22) PCT Filed: Sep. 29, 2010

(86) PCT No.: PCT/KR2010/006647
§ 371 (c)(1),
(2), (4) Date: Jun. 1, 2012

(87) PCT Pub. No.: WO2011/040763
PCT Pub. Date: Apr. 7, 2011

(65) Prior Publication Data
US 2012/0230247 A1 Sep. 13, 2012

(30) Foreign Application Priority Data

Sep. 29, 2009 (KR) .................. 10-2009-0092715
Feb. 5, 2010 (KR) .................. 10-2010-0011209
Mar. 23, 2010 (KR) .................. 10-2010-0025995

(51) Int. Cl.
*H04B 7/26* (2006.01)
*H04B 7/02* (2006.01)
(Continued)

(52) U.S. Cl.
CPC ............. *H04B 7/2606* (2013.01); *H04B 7/022* (2013.01); *H04B 7/0408* (2013.01); *H04B 7/155* (2013.01); *H04W 28/18* (2013.01); *H04W 76/02* (2013.01); *H04W 84/12* (2013.01); *H04W 88/04* (2013.01)
USPC .......................................... 370/315; 370/311

(58) Field of Classification Search
USPC .......................... 370/252, 351, 401; 455/13.1
See application file for complete search history.

(56) References Cited

U.S. PATENT DOCUMENTS 7,573,842 B2 * 8/2009 Xie et al. ....................... 370/311
7,684,337 B2 * 3/2010 Mehta et al. ................... 370/238
(Continued)

FOREIGN PATENT DOCUMENTS

GB          2455794 A      6/2009
KR     2009/0117244 A     11/2009
WO   WO-2007021602 A1     2/2007

OTHER PUBLICATIONS

Marc Kuhn et al., "Two-way Communication for IEEE 802.11n WLANs Using Decode and Forward Relays", Asilomar Conference on Signals, Systems, and Computers 2006, Oct. 2006, pp. 681-685.

*Primary Examiner* — Edan Orgad
*Assistant Examiner* — Emmanuel Maglo
(74) *Attorney, Agent, or Firm* — Rabin & Berdo, P.C.

(57) ABSTRACT

A method and apparatus for setting up a relay link to transfer a data frame using a relay in a wireless communication system are provided. The relay link setup method of a source STA in a wireless communication system may include receiving capability information of at least one relay supporting station included in the wireless communication system from an access point (AP) or a personal basic service set (PBSS) central point (PCP), selecting one of the at least one relay supporting station as a relay station, using beam forming information among the source station, a destination station, and the at least one relay supporting station and the capability information, transferring a relay link setup request frame to the destination station, and receiving a relay link setup response frame that includes information on a relay link setup result from the destination station. The relay link setup request frame and the relay link setup response frame may pass through the relay station.

20 Claims, 5 Drawing Sheets

(51) Int. Cl.
  *H04B 7/04*     (2006.01)
  *H04B 7/155*    (2006.01)
  *H04W 28/18*    (2009.01)
  *H04W 76/02*    (2009.01)
  *H04W 84/12*    (2009.01)
  *H04W 88/04*    (2009.01)

(56) References Cited

U.S. PATENT DOCUMENTS

| | | | |
|---|---|---|---|
| 7,706,283 B2 * | 4/2010 | Mehta et al. | 370/238 |
| 7,873,338 B2 * | 1/2011 | Visotsky et al. | 455/226.2 |
| 7,920,501 B2 * | 4/2011 | Larsson et al. | 370/315 |
| 8,027,301 B2 * | 9/2011 | Oyman et al. | 370/330 |
| 8,045,497 B2 * | 10/2011 | Kim et al. | 370/315 |
| 8,223,873 B2 * | 7/2012 | Xia et al. | 375/267 |
| 8,238,274 B2 * | 8/2012 | Solomon | 370/310 |
| 8,402,132 B2 * | 3/2013 | Kang et al. | 709/224 |
| 2003/0063593 A1 * | 4/2003 | Koyanagi et al. | 370/338 |
| 2007/0076649 A1 * | 4/2007 | Lin et al. | 370/328 |
| 2007/0165581 A1 * | 7/2007 | Mehta et al. | 370/338 |
| 2008/0232296 A1 | 9/2008 | Shin et al. | |
| 2008/0310348 A1 * | 12/2008 | Nandagopalan et al. | 370/328 |
| 2009/0010215 A1 | 1/2009 | Kim et al. | |
| 2009/0055504 A1 * | 2/2009 | Xie et al. | 709/207 |
| 2009/0073945 A1 | 3/2009 | Seok | |
| 2009/0109888 A1 * | 4/2009 | Xie et al. | 370/311 |
| 2009/0116419 A1 * | 5/2009 | Chong et al. | 370/312 |
| 2010/0008221 A1 * | 1/2010 | Hong et al. | 370/226 |
| 2010/0008247 A1 * | 1/2010 | Kwon et al. | 370/252 |
| 2010/0304666 A1 * | 12/2010 | Hottinen et al. | 455/7 |
| 2011/0256828 A1 * | 10/2011 | Hsu et al. | 455/13.1 |
| 2012/0120892 A1 * | 5/2012 | Freda et al. | 370/329 |

* cited by examiner

US 8,989,078 B2

METHOD AND APPARATUS FOR SETTING UP A RELAY LINK IN A WIRELESS COMMUNICATION SYSTEM

TECHNICAL FIELD

The present invention relates to a method and apparatus for setting up a relay link, and more particularly, to a relay link setup method and apparatus for transfer of a data frame using a relay in a wireless communication system.

BACKGROUND ART

In a wireless communication system, for example a wireless local area network (WLAN) environment of the institute of electrical and electronics engineers (IEEE) 802.11, a data frame is transferred via an access point (AP) or directly by a peer-to-peer method. However, according to a general transfer method that uplinks and downlinks the data frame with respect to the AP, other devices present in the network, such as stations, have to contend to obtain a channel. Accordingly, a throughput for data transfer may be reduced.

To solve such a limit, the data frame may be directly transferred between stations without passing through the AP through a direct link setup (DLS) mode between the stations, such that a channel use efficiency may be at least doubled. However, even when the DLS mode is used, the throughput of the wireless network may be reduced when a channel state is deteriorated by multiple paths, attenuation, interference and the like. Also, in a case requiring a quality of service (QoS), such as multimedia streaming, a demanded QoS may not be met.

In particular, the foregoing limits may become prominent in the WLAN, such as a 60 gigahertz (GHz) band that is currently standardized and uses millimeter waves. Millimeter wave communication may easily transfer data of several gigabits per second (Gbps) without high modulation, using a wide band such as a 2 GHz band. However, the millimeter wave communication may cause considerable loss of power due to characteristics of high frequency waves having a high degree of straightness. To overcome the loss of power, obtaining a high antenna gain by collecting power in a particular direction is recommended, rather than all directions using a directional antenna.

However, when a line-of-sight (LOS) is not secured, signals may be transferred in a reflective manner. In this case, a signal transfer distance is increased, thereby increasing an attenuation loss. Consequently, loss by the reflection may be added. Furthermore, when a person interrupts the LOS, a penetration loss becomes almost 20 decibels (dB) or more. Since an interior door or wall usually causes a greater loss by interruption, it is difficult for signals to reach a destination.

As aforementioned, to overcome limits that may occur even with use of the DLS mode and the directional antenna, there is a need for a method enabling relay of a frame through another station other than the AP in the wireless network.

DISCLOSURE OF INVENTION

Technical Goals

An aspect of the present invention provides a relay link setup method and apparatus for transfer of a data frame using a relay in a wireless communication system.

Other aspects and advantages of the present invention will be understood from the following description, and become more apparent through embodiments. Also, it will be understood that aspects and advantages of the present invention will be embodied by any means and combination of the means described in claims.

Technical Solutions

According to an aspect of the present invention, there is provided a relay link setup method of a source station in a wireless communication system, the method including receiving capability information of at least one relay supporting station included in the wireless communication system from an access point (AP) or a personal basic service set (PBSS) central point (PCP); selecting one of the at least one relay supporting station as a relay station, using beam forming information among the source station, a destination station, and the at least one relay supporting station and the capability information; transferring a relay link setup request frame to the destination station; and receiving a relay link setup response frame that includes information on a relay link setup result from the destination station. The relay link setup request frame and the relay link setup response frame may pass through the relay station.

According to another aspect of the present invention, there is provided a relay link setup method of a relay station in a wireless communication system, the method including performing beam forming, along with a source station; transferring, to the source station, channel measurement information according to the beam forming with the source station; receiving a relay link setup request frame from the source station and transferring the relay link setup request frame to the destination station; and receiving a relay link setup response frame that includes information on a relay link setup result from the destination station and transferring the relay link setup response frame to the source station.

According to another aspect of the present invention, there is provided a relay link setup method of a destination station in a wireless communication system, the method including performing beam forming along with a source station and at least one relay supporting station; transferring channel measurement information according to the beam forming with the source station and the at least one relay supporting station to the source station; receiving a relay link setup request frame from the source station; and transferring a relay link setup response frame that includes information on a relay link setup result to the source station, wherein the relay link setup request frame and the relay link setup response frame pass through a relay station selected by the source station from the at least one relay supporting station.

According to another aspect of the present invention, there is provided a source STA for performing relay link setup in the wireless communication system, the source STA including a relay link setup apparatus according to an embodiment of the present invention may include a first receiving unit to receive capability information of at least one relay supporting STA included in the wireless communication system from an AP or a PCP, a select unit to select one of the at least one relay supporting STA as a relay STA using beam forming information among the source STA, the destination STA, and the at least one relay supporting STA and the capability information, a transfer unit to transfer an RLS request frame to the destination STA, and a second receiving unit to receive an RLS response frame that includes relay link setup result information from the destination STA. The RLS request frame and the RLS response frame may pass through the relay STA.

According to another aspect of the present invention, there is provided a relay STA for performing relay link setup in the wireless communication system, the relay STA including a beam forming unit to perform beam forming along with a source STA, a first transfer unit to transfer channel measurement information according to the beam forming performed with the source STA to the source STA, a second transfer unit to receive an RLS request frame from the source STA and transfer the RLS request frame to the destination STA, and a third transfer unit to receive an RLS response frame that includes relay link setup result information from the destination STA and transfer the RLS response frame to the source STA.

According to another aspect of the present invention, there is provided a destination STA for performing relay link setup in the wireless communication system, the destination STA including a relay link setup apparatus may include a beam forming unit to perform beam forming along with a source STA and at least one relay supporting STA, a first transfer unit to transfer channel measurement information according to the beam forming performed with the source STA and the at least one relay supporting STA to the source STA, a receiving unit to receive an RLS request frame from the source STA, and a second transfer unit to transfer an RLS response frame that includes relay link setup result information to the source STA. The RLS request frame and the RLS response frame may pass through the relay STA selected by the source STA from the at least one relay supporting STA.

BEST MODE FOR CARRYING OUT THE INVENTION

Figure 1:
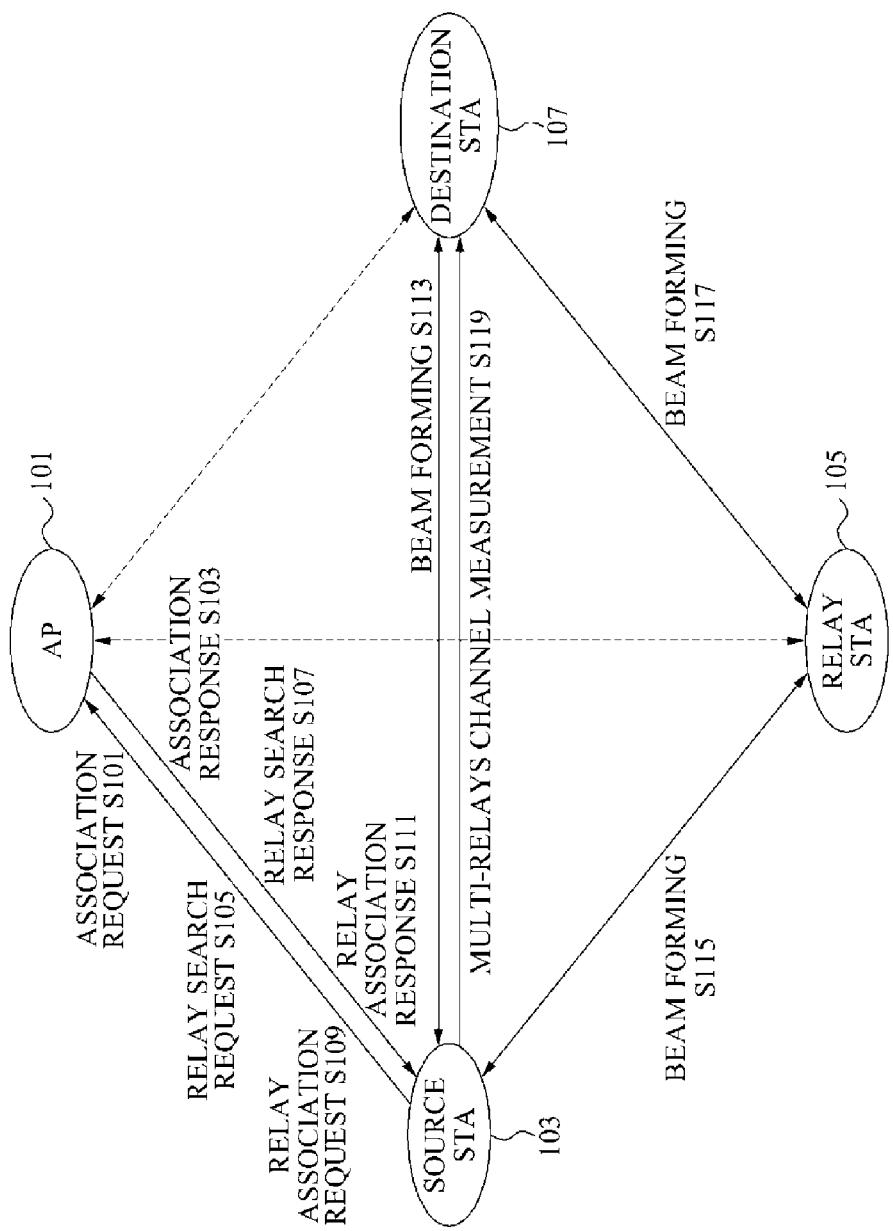
FIG. 1 is a diagram illustrating a relay link setup method in a wireless communication system according to an embodiment of the present invention.

Reference will now be made in detail to embodiments of the present invention with reference to the accompanying drawings to fully explain the present invention in such a manner that it may easily be carried out by a person with ordinary skilled in the art to which the present invention pertains. The foregoing aspects, features, and advantages will be more apparent through the description that follows. Moreover, detailed descriptions related to well-known functions or configurations will be omitted in order not to unnecessarily obscure subject matters of the present invention.

A wireless network complying with the institute of electrical and electronics engineers (IEEE) 802.11 standard applies one of two modes, that is, an infrastructure basic service set (BSS) and an independent BSS (IBSS), so called ad hoc. The infrastructure BSS includes an access point (AP) and a distribution system (DS) and generally uses the AP in almost all communication processes including communication between stations (STA). The IBSS constructs a network including only STAs without APs and does not allow an access through a DS.

Further, according to the infrastructure BSS, frames are received and transferred generally through an AP. A new wireless local access network (WLAN) defines a direct link set (DLS) process for direct communication between quality of service (QoS) STAs (QSTAs). According to the DLS process, the QSTA may set a direct link between the QSTAs by receiving and transferring a DLS request frame and a DLS response frame through a QoS AP or a legacy AP.

Additionally, according to the IBSS which does not include APs, all communication processes are performed in such a manner that a STA to perform communication makes a contention-based channel access such as distributed coordination function (DCF), thereby performing direct communication with a peer STA. According to a personal BSS (PBSS) which is an example type of the IBSS, a PBSS central point (PCP) may function similar to the AP.

Embodiments of the present invention will describe a method of receiving and transferring data using a relay rather than a DLS path or an AP passing path in a wireless communication system such as the infrastructure BSS or the IBSS. That is, the embodiments of the present invention may be applied to a communication system that uses not only the AP but also the PCP or a network coordinator. Therefore, hereinafter, a description related to the AP may also be applied to the PCP or the network coordinator.

According to the embodiments of the present invention, a relay link may be set up and data may be transferred through the relay link. For this, a relay STA for setting up the relay link is selected from STAs included in a wireless communication system, and data is transferred through the selected relay STA. That is, data transferred from a source STA may be passed through the selected relay STA and received by a destination STA.

Here, a process of recognizing directions of the respective STAs is necessary to set up three links, that is, a source STA-relay STA (S-R) link, a relay STA-destination STA (R-D) link, and a source STA-destination STA (S-D) link. Two methods may be suggested for recognizing the directions of the STAs included in the wireless communication system.

According to a first method adopted by a standardization organization using 60 GHz, two STAs may recognize the directions by performing beam forming through a directional antenna. Beam forming may be simultaneously performed with respect to the three links. However, beam forming requires a quantity of resources. Furthermore, a great amount of time may be necessary since beam forming is performed without information on a physical position of an initial relay STA.

Accordingly, the directions of the STAs may be recognized through a second method which performs beam forming by scanning in units of preset sectors. That is, a STA to perform communication may perform beam forming in a limiting manner through sector level sweep (SLS), thereby roughly recognizing the direction of the relay STA and setting a corresponding relay link. Additionally, a relay STA capable of performing data transfer more efficiently may be selected using channel measurement information obtained through beam forming.

Hereinafter, a relay link setup method according to the first method will be described with reference to FIG. 1. Also, a relay link setup method according to the second method will be described with reference to FIG. 2. Although embodiments of the present invention will describe the relay link setup methods in the BSS, the embodiments are also applicable to the IBSS such as a personal BSS (PBSS).

FIG. 1 is a diagram illustrating a relay link setup method in a wireless communication system according to an embodiment of the present invention.

As shown in FIG. 1, the wireless communication system includes an AP 101, a source STA 103, a relay STA 105, and a destination STA 107. The source STA 103 may transfer an association request frame to the AP 101 according to passive scan in operation S101, and receive an association response frame from the AP 101 in operation S103, thereby joining a wireless network. The source STA 103 may receive a beacon frame transferred from the AP 101, thereby transferring the association request frame. Alternatively, the source STA 103 may join the wireless network, by receiving and transferring a probe request frame and a probe response frame with respect to the AP 101 according to active scan. The relay STA 105 and the destination STA 107 may join the wireless network in the same manner as the source STA does.

Here, the STAs may transfer capability information of themselves to the AP 101 by including the capability information in the association request frame or the probe request frame. The capability information may refer to relay capability information of the STA, which is necessary for relay communication. That is, the STAs may inform the AP 101 as to whether to use relay, whether to support relay, and the like, through the capability information. The capability information may include at least one selected from relay support information, relay use information, alternating current (A/C) power use information, mobility information, relay function preference information, relay method information, and cooperative communication support information. Also, the AP 101 may transfer capability information of the AP 101 to the STAs by including the capability information in the association response frame, the probe response frame, or the beacon frame.

The relay capability information may be included in the association request frame or the probe request frame in a format as shown in Table 1 to Table 3 below. Table 1 indicates a format of the capability information. Table 2 indicates a capability information field. Table 3 indicates a sub field in relation to Table 2. The relay capability information may include association identifier (AID) information of each STA.

TABLE 1

| Element ID | Length | Relay Capability Info |
|---|---|---|
| Octets: 1 | 1 | 2 |

<Relay Capabilities element format>

TABLE 2

| <Relay Capabilities info field> | | | | | | | |
|---|---|---|---|---|---|---|---|
| Relay Supportability | Relay Usability | Relay Permission | A/C Power | Mobility | Relay Preference | Duplex | Cooperation |
| Bit B0 | B1 | B2 | B3 | B4 | B5 | B6-B7 | B8 |

TABLE 3

| Subfield | Definition | Encoding |
|---|---|---|
| Relay Supportability | Indicates that STA is capable of relaying via itself by transmitting and receiving frames between a pair of other STAs. A STA capable of realying support is named "relay STA". | Set to 1 if STA is relay support capable. Otherwise set to 0 |
| Relay Usability | Indicates that STA is capable of using frame-relaying through a relay STA. | Set to 1 if STA is relay usable capable. Otherwise set to 0 |
| Relay Permission | Indicates that PCP/AP permits when a pair of STAs exchange data via relay STA | Set to 0 by PCP/AP if not permission. Set to 1 by if permission |
| A/C Power | Indicates that relay STA is capable of obtaining A/C power | Set to 1 if relay STA is capable of being supplied by A/C power. Otherwise set to 0 |
| Mobility | Indicates that relay STA is capable of support mobility | Set to 1 if relay STA is capable of support mobility. Otherwise set to 0 |
| Relay Preference | Indicates that a STA is desirable to become RSS rather than RUS | Set to 1 if a STA is desirable to be RSS. Otherwise set to 0 |
| Duplex | Indicates whether a STA is capable of FD/AF or HD/DF. | Set to 01 is relay STA is not capable of HD/DF but only capable of FD/AF. Set to 10 if relay STA is capable of HD/DF but not capable of FD/AF. Set to 11 if relay STA is capable of both HD/DF and FD/AF. 00 is reserved. |
| Cooperation | Indicates whether a STA is capable of supporting Link-switching or Link-cooperating. | Set to 1 if a STA supports Link cooperating. Set to 0 either if a STA supports Link-switching, or if Duplex is set to 01. |

<subfields of the relay capabilities info filed>

The 'Relay Supportability' field that corresponds to the relay support information may indicate whether an STA is capable of relaying by using a value of 0 or 1.

The 'Relay Usability' field that corresponds to the relay use information may indicate whether the STA is capable of transferring a frame through relay by using a value of 0 or 1. In case of directional communication such as millimeter wave communication, the 'Relay Usability' field may imply capability of searching for not only a line-of-sight (LOS) but also a relay STA and performing directional communication in the corresponding direction.

The 'Relay Permission' field may indicate whether relay communication of the AP 101 is permitted in the BSS which includes the AP 101.

The 'A/C Power' field that corresponds to the A/C power use information may indicate whether the AP 101 or the STA receives power from an A/C power source by using a value of 0 or 1.

The 'Mobility' field that corresponds to the mobility information may indicate whether the AP 101 or the STA is fixed or mobile by using a value of 0 or 1.

The 'Relay Preference' field that corresponds to the relay function preference information may indicate whether the STA will function mainly as the relay STA 105, by using a value of 0 or 1. When the 'Relay Preference' field is 1, the corresponding STA is preferred to function mainly as the relay STA 105.

The 'Duplex' field that corresponds to the relay method information may indicate whether the STAs will use a full duplex amplify-and-forward (FD/AF) relay method or a half duplex decode-and-forward (HD/DF) relay method for communication. When the 'Duplex' field is 01, the relay STA 105 may support both FD/AF and HD/DF. When the 'Duplex' field is 10, the relay STA 105 may support HD/DF. When the 'Duplex' field is 11, the relay STA 105 may support FD/AF.

At last, the 'Cooperation' field that corresponds to the cooperative communication support information may indicate whether the STA will use only one or both of a direct link and a relay link, by using a value of 0 or 1. When the 'Cooperation' field is 1, the STA may be a link cooperation type that uses both of the direct link and the relay link. When the 'Cooperation' field is 1, the STA may be a link switching type which uses the direct link or the relay link according to a link status. The 'Cooperation' field is effective only in the HD/DF relay method.

When the AP 101 permits relay communication, the source STA 103 may transfer a relay search request frame for searching for a relay supporting STA to the AP 101, in operation S105. Here, the source STA 103 may confirm whether the AP 101 permits relay communication using the capability information of the AP 101 transferred from the AP 101.

The AP 101 may transfer a relay search response frame that includes the capability information of the STA included in the BSS to the source STA 103, in operation S107. As aforementioned, the AP 101 may receive the capability information from the STA included in the BSS.

The source STA 103 may select the relay STA by receiving the STA information of the relay STA 105 from the AP 101. That is, at least one relay supporting STA that supports a relay function may be included in one BSS. The source STA 103 may select the relay STA for setting a relay link from the at least one relay supporting STA. According to the embodiment shown in FIG. 1, a single relay supporting STA is included in the BSS as the relay STA 105 and a relay link is set with respect to the relay STA 105. Hereinafter, a method of selecting the relay STA 105 will be described.

For example, presuming that a fixed STA has a higher priority than a mobile STA, that a STA using A/C power has a higher priority than a STA using battery power, and that the 'Mobility' field has a higher priority than the 'A/C Power' field, the priority may be determined as 'Fixed STA>Mobile STA & A/C Power STA>Mobile STA & Battery Power STA.' In this case, the source STA 103 may select a laptop rather than a mobile phone and select a television (TV) rather than a laptop as the relay STA.

The priority may be determined as shown in Table 4 below. That is, the priority may be determined in order of a channel status, the relay function preference information, the A/C power use information, and the mobile information. Since a physical position of the relay STA 105 is an influential factor for the communication performance, the channel status among STAs may be given highest priority in selection of the relay STA 105. Information on the channel status may be obtained through beam forming that will be described later or scanning that will be described with reference to FIG. 2.

TABLE 4

| Order | Information | Note |
|---|---|---|
| 1 | Channel status | Higher value is preferred. It is obtained by STA Scan operation. |
| 2 | Relay preference field = 1 | Relay preference field = 1 is preferred. |
| 3 | A/C power field = 1 | A/C power field = 1 is preferred. |
| 4 | Mobility field = 0 | Mobility field = 0 is preferred. |

<Relay STA selection criteria>

Next, the source STA 103 may perform relay association with respect to the selected relay STA 105. The source STA 103 may transfer a relay association request frame to the AP 101, in operation S109. Here, DLS may be completed between the source STA 103 and the destination STA 107. That is, the relay association may refer to a process of performing initialization for having data to be transferred between the source STA 103 with which DLS is completed and the destination STA 107 bypassing the relay STA 105, and a process of performing beam forming of three links among the respective STAs, that is, the S-R link, the R-D link, and the S-D link.

The AP 101 may broadcast a relay association response frame to the STA in response to the relay association request frame, in operation S111. The AP 101 may reserve a section for the beam forming with respect to the three links, and transfer the relay association response frame that includes information on a start address and duration of the reserved section. Since beam forming needs to be performed with respect to all of the STAs 103, 105, and 107 included in the BSS, the AP 101 may broadcast the relay association response frame. When resources are sufficient for allocation of the beam forming section, the AP 101 may allocate a section enabling beam forming of the three links simultaneously. When resources are insufficient, the AP 101 may separately allocate resources per link.

A format of the relay association request frame may be as shown in Table 5. A format of the relay association response frame may be as shown in Table 6.

TABLE 5

| Order | Information |
|---|---|
| 1 | Category |
| 2 | Action |
| 3 | Dialog Token |
| 4 | Destination Relay Usable STA AID |

TABLE 6

| Order | Information |
|---|---|
| 1 | Category |
| 2 | Action |
| 3 | Dialog Token |
| 4 | Status Code |
| 5 | Relay Capable STA Info |
| . . . | . . . |
| N + 4 | Relay Capable STA N Info |

In Table 5, the 'Category' field may indicate millimeter wave communication. The 'Action' field may indicate frame types. The 'Dialog Token' field may include a value selected by a STA that transfers a request frame for distinction between request transaction and response transaction. The 'Destination Relay Usable STA AID' field may indicate an AID of a target destination STA. In FIG. 1, the target destination STA refers to the destination STA 107.

In Table 6, the 'Status Code' field may indicate status information related to a relay search request. When the 'Status Code' field is 0, the relay search request may be successful. A next field following the 'Status Code' field may include an address of the STA, the capability information, and relay link setup information with respect to another STA. When the 'Status Code' field is 37, the relay search request may be rejected. When the 'Status Code' field is 37, the relay search request may be rejected since the BSS does not include a relay supporting STA. The 'Relay capable STA Info' field may include the capability information described with reference to Table 1 to Table 3.

The 'Action' field value in Table 5 and Table 6 may be defined as shown in Table 7 below. An 'Action' field value of a frame format described hereinafter may also be defined as shown in Table 7.

TABLE 7

| Action field value | meaning |
| --- | --- |
| 0 | Relay Search Request |
| 1 | Relay Search Response |
| 2 | Multi-Relays Channel Measurement Request |
| 3 | Multi-Relays Channel Measurement Report |
| 4 | RLS Request |
| 5 | RLS Response |
| 6 | RLS Announcement |
| 7 | RLS Teardown |
| 8 | Relay Acknowledgment |
| 9-255 | Reserved |

<Relay Action Field Values>

The STAs 103, 105, and 107 included in the BSS may perform beam forming using information included in the relay association response frame in operations S113, S115, and S117. When the section enabling beam forming of the three links simultaneously is allocated, the beam forming may be performed in order of the S-R link, the R-D link, and the S-D link. Here, in operation S119, the destination STA 107 may transfer, to the source STA 103, a multi-relays channel measurement report frame which includes channel measurement information according to the beam forming and internal angle information between a direction toward the relay STA 105 and a direction toward the source STA 103. The channel information according to the beam forming is related to the link between the relay STA 105 and the destination STA 107 and the link between the source STA 103 and the destination STA 107. The multi-relays channel measurement report frame will be described in further detail with reference to FIG. 2.

The source STA 103 may select the relay STA using a beam forming result and the channel measurement information. In addition, the source STA 103 may transfer, to the AP 101, a relay association report frame that includes information on a relay association result. Thus, the relay link setup may be completed. Therefore, the source STA 103, the relay STA 105, and the destination STA 107 may receive and transfer data using the respective links.

Figure 2:
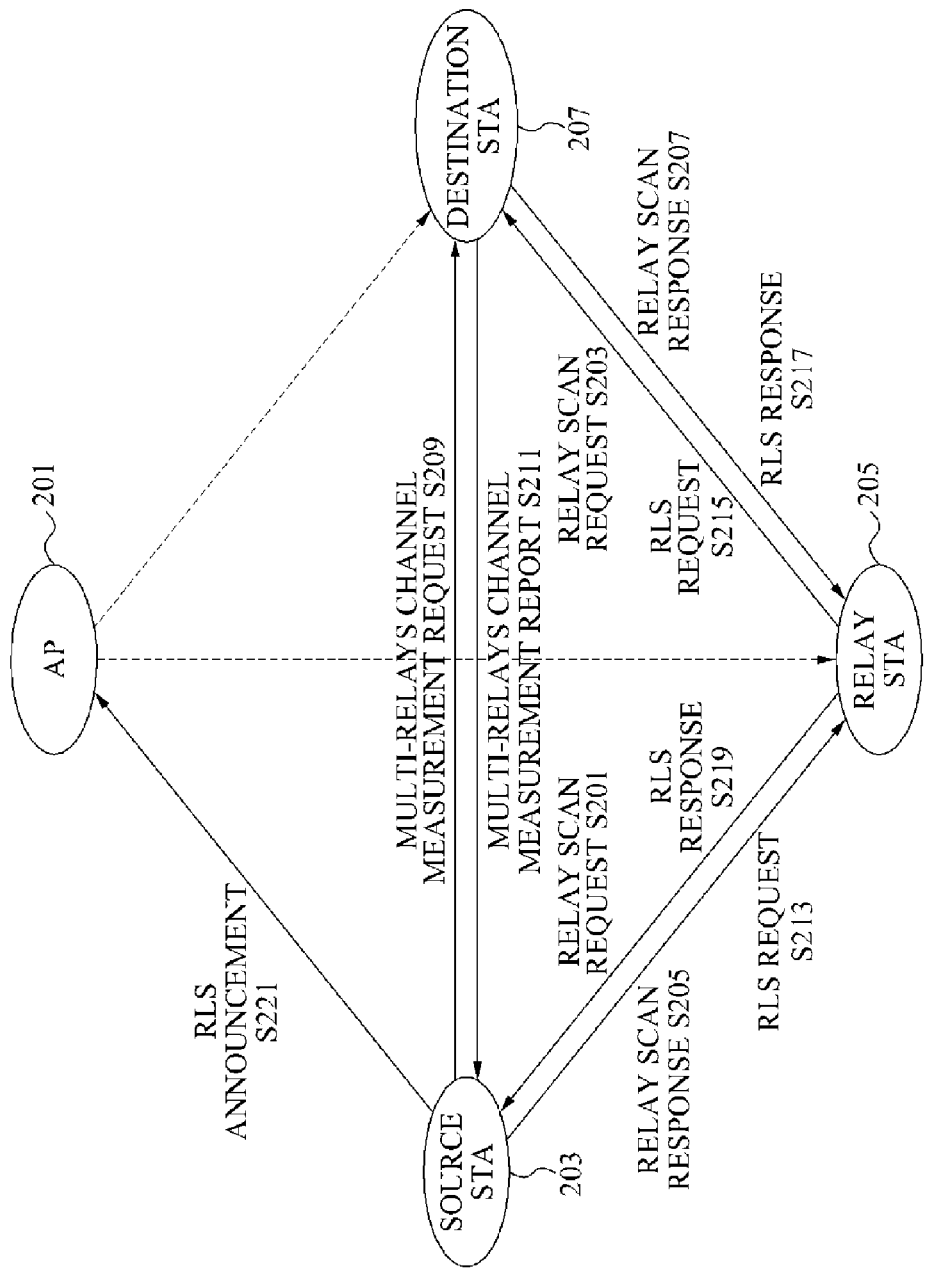
FIG. 2 is a diagram illustrating a relay link setup method in a wireless communication system according to another embodiment of the present invention.

FIG. 2 is a diagram illustrating a relay link setup method in a wireless communication system according to another embodiment of the present invention.

The relay link setup method of FIG. 2 is similar to the relay link setup method of FIG. 1. However, according to the relay link setup method of FIG. 2, beam forming between STAs is performed through scanning in units of preset sectors and a relay link is set up through a relay link setup (RLS) request frame after the beam forming Hereinafter, the relay link setup method will be described in detail.

As shown in FIG. 2, the wireless communication system may include an AP 201, a source STA 203, a relay STA 205, and a destination STA 207. In the same manner as in the embodiment of FIG. 1, the STAs 203, 205, and 207 included in a BSS may access a wireless network, and the source STA 203 obtains capability information of the STAs and the AP 201 included in the BSS. That is, the source STA 203 may obtain the capability information by transferring a relay search request frame to the AP 201.

Next, the STAs 203, 205, and 207 included in the BSS may perform beam forming through scanning performed in units of preset sectors. The STAs 203, 205, and 207 included in the BSS may perform scanning by sweeping the preset sector using a quasi-omni antenna pattern and may recognize locations relative to one another. Here, the direction toward each STA may indicate a direction of the preset sector when only sector sweeping is performed during the scanning, or indicate a direction inferred from a weighting vector calculated through reception beam forming.

Here, the AP 201 may reserve relay scan with respect to the STA included in the BSS. The relay scan refers to scanning in units of the preset sectors. The AP 201 may reserve the relay scan with respect to a predetermined scan section as the beam forming section of FIG. 1 is reserved, by broadcasting relay scan request frames. The relay STA 205 may transfer the relay scan request frames to the source STA 203 and the destination STA 207 in operations S201 and S203. The source STA 203 and the destination STA 207 may transfer relay scan response frames to the relay STA 205 in operations S205 and S207, thereby performing scanning.

Through the scanning, channel measurement information may be obtained with respect to the three links, that is, the S-R link, the R-D link, and the S-D link. In addition, the source STA 203 may select a relay STA from at least one relay supporting STA using the channel measurement information. That is, the source STA 203 may select the relay STA having high transfer efficiency using not only the received capability information but also the channel measurement information along with the capability information.

The source STA 203 may transfer a multi-relays channel measurement request frame for requesting the channel measurement information to the destination STA 207, in operation S209. The destination STA 207 may transfer a multi-relays channel measurement report frame to the source STA 203, in operation S211. Here, the source STA 203 may transfer the multi-relays channel measurement request frame also to the relay STA 205.

The channel measurement information may include channel measurement information between the source STA 203 and the destination STA 207, channel measurement information between the relay STA 205 and the destination STA 207, and internal angle information between the S-D link and a link between the destination STA 207 and the relay supporting STA. When the relay STA 205 transfers the multi-relays channel measurement request frame to the source STA 203, the channel measurement information may include channel measurement information between the source STA 203 and the relay STA 205, channel measurement information between the relay STA 205 and the destination STA 207, and internal angle information between the S-R link and the R-D link. When the BSS includes a plurality of relay supporting STAs, the channel measurement information may include information on all of the plurality of relay supporting STAs.

A format of the multi-relays channel measurement request format and a format of the multi-relays channel measurement report frame may be configured as shown in Table 8 and Table 9, respectively. In Table 9, a 'Channel Measurement Info' field may be a field including channel measurement information related to a channel with at least one STA. A format of the 'Channel Measurement Info' may be configured as shown in Table 10.

TABLE 8

| Order | Information |
|---|---|
| 1 | Category |
| 2 | Action |
| 3 | Dialog Token |

<Multi-Relays Channel Measurement Request>

TABLE 9

| Order | Information |
|---|---|
| 1 | Category |
| 2 | Action |
| 3 | Dialog Token |
| 4 | Channel Measurement Info 1 |
| ... | ... |
| N + 3 | Channel Measurement Info N |

<Multi-Relays Channel Measurement Report>

TABLE 10

| | Peer STA AID | SNR | Internal Angle | Recommend | Reserved |
|---|---|---|---|---|---|
| Bits: | B0-B7 | B8-B15 | B16-B22 | B23 | B24-B31 |

<Channel Measurement Info field>

In Table 10, the 'Peer STA AID' field may indicate an AID of a STA that transfers the multi-relays channel measurement report frame channel measurement information. The 'SNR' field may indicate a signal-to-noise ratio (SNR) value measured in the link. The 'Internal angle' field may indicate the internal angle information. The 'Recommend' field may indicate whether the link is recommended according to a channel measurement result. When the measured link is recommended, the 'Recommend' field value may be set to 1.

The internal angle information between the S-D link and the link between the source STA 203 and the relay supporting STA may be used to prevent following cases.

First, when only the channel measurement information is measured, a case in which a link between the source STA and the destination STA includes a relay STA vertically or horizontally disposed may be determined to be in a better location than a case in which the direct link does not include the relay STA. However, since a main purpose of using the relay link is bypassing in case that the direct link is blocked, when the relay STA is present on or around the direct link, even the relay link may be blocked by a high probability when the direct link is blocked by a moving object. Therefore, such a case may be solved by measuring the internal angle between the S-D link and the link between the source STA 203 and the relay supporting STA, and selecting the relay supporting STA when the internal angle is larger than or equal to a predetermined threshold value.

Second, the relay STA 205 may particularly adopt a full duplex (FD) method since divergence by a positive feedback may be prevented when a data transferring direction and a data receiving direction are separate than when the directions are identical. The data transferring direction and the data receiving direction may be identical although a transmitter (Tx) antenna, a receiver (Rx) antenna, and a radio frequency (RF) module are physically separated. The relay STA 205 may recognize the aforementioned state and inform the source STA 203 of the state, by setting the 'Recommend' field to 0 when a dissipation degree is high although the internal angle is large. In addition, the internal angle information measured by the relay STA 205 and the destination STA 207 may enable the source STA 203 to recognize locations of the relay STA 205 and the destination STA 207 because the three links form a triangle. That is, since the source STA 203 may recognize the location of the relay STA 205 using the internal angle information, the source STA 203 may be prevented from being located at a location that may block the relay STA 205 by a high probability although the internal angle is large.

When the relay STA 205 is present on a direct link between the source STA 203 and the destination STA 207, the direct link may be disconnected by a high probability as a person passes by the source STA 203 and the destination STA 207. Therefore, it is preferred that the relay STA 205 is located diagonally. The source STA 203 may select an optimal relay STA using the channel measurement information.

That is, as aforementioned, the source STA 203 may select the relay STA 205 from the at least one relay supporting STA using the channel measurement information and the capability information.

When the relay STA is selected, the source STA 203 may transfer an RLS request frame to the destination STA 207 in operations S213 and S215. The destination STA 207 may transfer an RLS response frame that includes relay link setup result information to the source STA 203 in operations S217 and S219. That is, the destination STA 207 may transfer, to the source STA 203, the RLS response frame that includes information on whether the destination STA 207 succeeded or failed in the RLS, that is, whether the destination STA 207 participated in RLS, in operations S217 and S219.

Here, the RLS request frame and the RLS response frame may pass through the relay STA 205. The relay STA 205 may also transfer the RLS response frame that includes the relay link setup result information to the source STA 203. RLS may be performed in a similar manner as DLS. In RLS, the relay STA 205 may perform the function of the AP of DLS.

The RLS request frame may include capability information and AID information of the source STA 203, the relay STA 205, and the destination STA 207, and may further include a relay transfer parameter. The relay transfer parameter may include at least one selected from relay method information, cooperative communication use information, transfer mode information according to use of the cooperative communication, data sensing time information indicating a deferred time caused by link switching, frame exchange section information between the source STA and the relay STA, and frame exchange section information between the relay STA and the destination STA.

Formats of the RLS request frame, the RLS response frame, and the relay transfer parameter may be configured as shown in Table 11 to Table 13. As shown in Table 12, the RLS response frame may also include the capability information and the AID information of the source STA 203, the relay STA 205, and the destination STA 207. In Table 12, a 'Destination Status Code' field may correspond to the relay link setup result information of the destination STA 207. When the destination STA 207 participates in RLS, the 'Destination Status Code' may be set to zero. When the destination STA 207 does not participate in RLS, the 'Destination Status Code' may be set to 37. A 'Relay Status Code' field corresponding to the relay link setup result information of the relay STA 205 may be set in the same manner as the 'Destination Status Code.'

TABLE 11

| Order | Information |
|---|---|
| 1 | Category |
| 2 | Action |
| 3 | Dialog Token |
| 4 | Destination AID |
| 5 | Relay AID |
| 6 | Source AID |
| 7 | Destination Capability Information |
| 8 | Relay Capability Information |
| 9 | Source Capability Information |
| 10 | RLS Timeout Value |
| 11 | Relay Transfer Parameter Set |

<RLS Request>

TABLE 12

| Order | Information |
|---|---|
| 1 | Category |
| 2 | Action |
| 3 | Dialog Token |
| 4 | Destination AID |
| 5 | Relay AID |
| 6 | Source AID |
| 7 | Destination Capability Information |
| 8 | Relay Capability Information |
| 9 | Source Capability Information |
| 10 | Destination Status Code |
| 11 | Relay Status Code (Optional) |

<RLS Response>

TABLE 13

| Element ID | Length | Relay Transfer Parameter |
|---|---|---|
| Octets: 1 | 1 | 8 |

<Relay Transfer Parameter Set IE>

The relay transfer parameter may be configured as shown in Table 14.

TABLE 14

| | Duplex-Mode | Cooperation-Mode | Tx-Mode | Reserved | Link Change Interval | Data Sensing Time | First Period | Second Period | Reserved |
|---|---|---|---|---|---|---|---|---|---|
| Bit | B0 | B1 | B2 | B3-B7 | B8-B15 | B16-B23 | B24-B39 | B40-B55 | B56-B63 |

The 'Relay Transfer Parameter' field may indicate a parameter necessary for setting a mode of the relay STA 205 that participated in RLS and for transferring data.

The 'Duplex-mode' field may correspond to the relay method information. When the relay STA 205 supports the FD-AF, one of the FD relay method and the HD relay method may be selected from the 'Duplex-mode' field. The 'Duplex-mode' field may be set to 0 when the relay STA 205 is to be operated by HD-DF and set to 1 when the relay STA 205 is to be operated by FD-AE.

The 'Cooperation-mode' field may correspond to the cooperative communication use information. A link-switching mode or a link-cooperating mode may be selected from the 'Cooperation-mode.' The 'Cooperation-mode' field may be set to 0 when the relay STA 205 is to be operated in the link-switching mode and set to 1 when the relay STA 205 is to be operated in the link-cooperating mode. In addition, the 'Cooperation-mode' field is valid when the relay STA 205 is in the link-cooperating mode and the 'Duplex-mode' field is set to 0, and may be ignored otherwise.

The 'Tx-mode' field may correspond to the transfer mode information according to use of the cooperation communication. When the three STAs participating in RLS are operated in a normal mode, the 'Tx-mode' field may be set to 0. When the three STAs participating in RLS are operated in an alternation mode, the 'Tx-mode' field may be set to 1. The normal mode is used by only one of the direct link and the relay link. The alternation mode is used by both of the direct link and the relay link. The 'Tx-mode' field is valid when the relay STA 205 is in the link-switching mode and the 'Duplex-mode' field is set to 1, and may be ignored otherwise.

The 'Link Change Interval (LCI)' field may correspond to the link switch section information indicating the link switch section. The 'LCI' field may indicate a section in which the link between the source STA 203 and the destination STA 207 is switched. That is, the 'LCI' field may inform a point of time for bypassing when data is bypassed to another path since a currently used path is blocked. A chance of switching the link may be given every LCI from an initial position of a reserved section. In one section, transfer to only one link is allowed. The data transfer path may be bypassed only at a point corresponding to every multiple number of the 'LCI' field value from the reserved time.

The 'Data Sensing Time' field may correspond to the data sensing time information indicating the deferred time caused by the link switching. The 'Data Sensing Time' field may indicate time deferred while link switching is performed from a currently used LCI to a following LCI. The 'Data Sensing Time' field may be used only in the normal mode, not in the alternation mode. Under the HD-DF relay mode, the 'Data Sensing Time' field may be used when the direct link is switched to the relay link, but not used when the relay link is switched to the direct link.

The 'First Period' field may correspond to the frame exchange section information between the source STA 203 and the destination STA 207. That is, the 'First Period' field may indicate a section in which frames are exchanged between the source STA 203 and the destination STA 207 when the relay link is used under the HD-DF relay mode.

The 'Second Period' field may correspond to the frame exchange section information between the relay STA 205 and the destination STA 207. That is, the 'Second Period' field may indicate a section in which frames are exchanged between the relay STA 205 and the destination STA 207 when the relay link is used under the HD-DF relay mode, and all frame sections for informing the source STA 203 of the status of the R-D link.

The relay transfer parameter may be updated even after the relay link is set. For example, when a channel environment is greatly changed after the relay transfer parameter is set, the 'LCI' field, the 'First Period' field, and the 'Second period' may be changed. The updated relay transfer parameter may be included in the RLS request frame and transferred from the source STA 203.

According to the relay link setup result information, the source STA 203 may transfer an RLS announcement frame that includes information on whether the relay link setup is successful to the AP 201, in operation S221. The AP 201 receiving the RLS announcement frame may confirm that the RLS is successful. A format of the RLS announcement frame may be configured as shown in Table 14 below. The RLS announcement frame may include AIDs of the source STA 203, the relay STA 205, and the destination STA 207 that participated in RLS.

TABLE 15

| Order | Information |
|---|---|
| 1 | Category |
| 2 | Action |
| 3 | Status Code |
| 4 | Destination AID |
| 5 | Relay AID |
| 6 | Source AID |

<RLS Announcement>

After the RLS announcement frame is transferred to the AP 201, beam forming may be performed again with respect to each of the three links to increase throughput of data transfer. Here, the beam forming may be performed in the same manner as described with reference to FIG. 1. Channel measurement information newly obtained during the beam forming may be transferred to the source STA 203. In addition, the relay transfer parameter may be updated.

In order to tear down the relay link, the source STA 203 may transfer a relay teardown frame to the relay STA 205, the destination STA 207, and the AP 201. The relay teardown frame may be transferred to the destination STA 207 passing through the relay STA 205. The relay teardown frame may include AID information of the source STA 203, the relay STA 205, and the destination STA 207. A format of the relay teardown frame may be configured as shown in Table 16.

TABLE 16

| Order | Information |
|---|---|
| 1 | Category |
| 2 | Action |
| 3 | Status Code |
| 4 | Destination AID |
| 5 | Relay AID |
| 6 | Source AID |

<RLS Teardown>

In addition, the relay source STA 205 may transfer a relay acknowledgement frame to the source STA 203 in which RLS is completed, to inform whether the RLS announcement frame is successfully received from the destination STA 207 through the set relay link. The relay acknowledgement frame may use the HD-DF relay method and may be used only in the link-switching mode. A format of the relay acknowledgement frame may be configured as shown in Table 17. A 'BA Control' field, a 'BlockAck Starting Sequence Control' field, and a 'BlockAck Bitmap' field may be used when a 'BlockAck' field is used.

TABLE 17

| Order | Information |
|---|---|
| 1 | Category |
| 2 | Action |
| 3 | BA Control(Optional) |
| 4 | BlockAck Starting Sequence Control(Optional) |
| 5 | BlockAck Bitmap(Optional) |

<Relay Acknowledgement>

The relay link setup methods described with reference to FIGS. 1 and 2 may be used together or wholly or partially altered and mixed. For example, beam forming through scanning in units of the preset sectors may be performed in the embodiment of FIG. 1. The beam forming as in FIG. 1 may also be performed in the embodiment of FIG. 2. The priority as shown in Table 4 may be used also in the embodiment of FIG. 2. Hereinafter, a link setup method of the source STA, the relay STA, and the destination STA of FIGS. 1 and 2 will be described.

Figure 3:
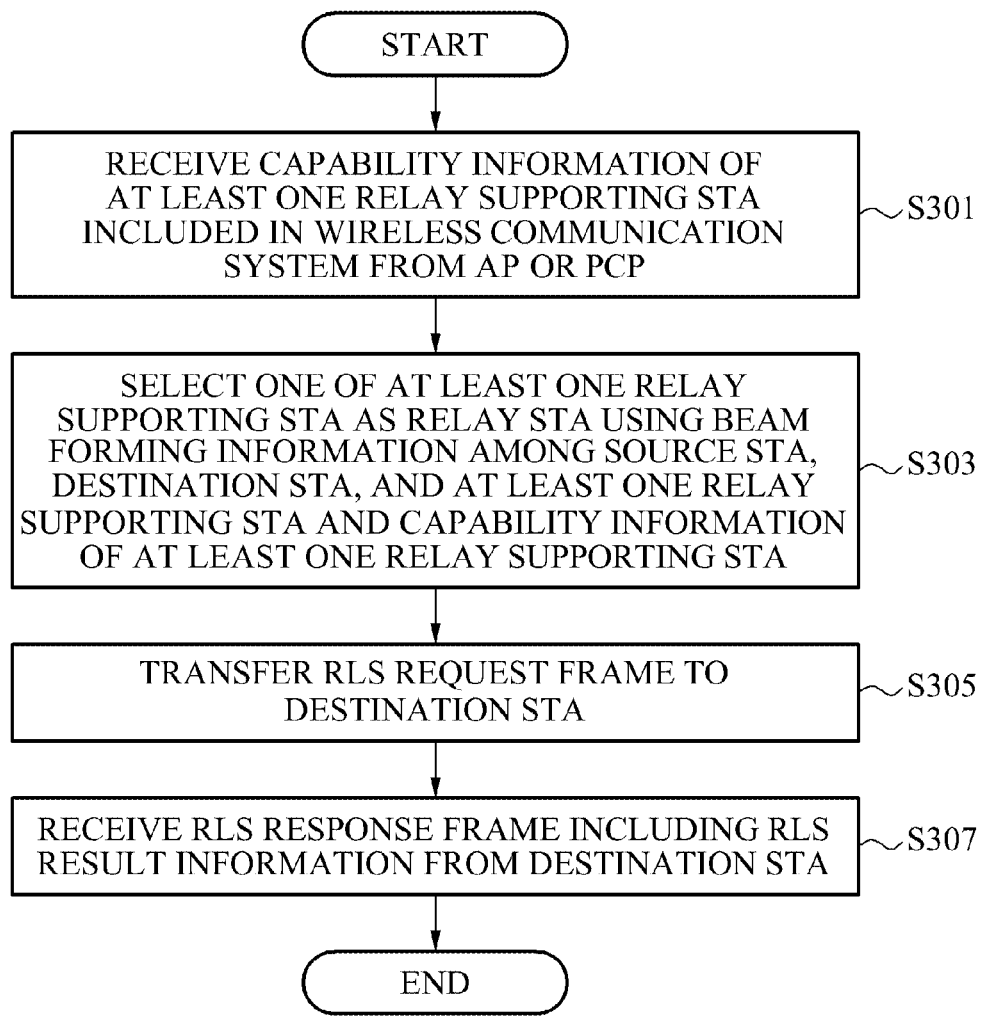
FIG. 3 is a diagram illustrating a relay link setup method of a source station (STA) in a wireless communication system according to an embodiment of the present invention.

FIG. 3 is a diagram illustrating a relay link setup method of a source STA in a wireless communication system according to an embodiment of the present invention. As shown in FIG. 3, the relay link setup method begins from operation S301.

In operation S301, the source STA may receive capability information of at least one relay supporting STA included in the wireless communication system from an AC or a PCP. In detail, operation S301 may include transferring, to the AP or the PCP, a relay search request frame for requesting the capability information of the at least one relay supporting station, and receiving a relay search response frame that includes the capability information of the at least one relay supporting station from the AP or the PCP. The at least one relay supporting station may transfer the capability information to the AP or the PCP when making an access to a wireless network.

In operation S303, the source STA may select one of the at least one relay supporting STA as a relay STA using beam forming information among the source STA, the destination STA, and the at least one relay supporting STA and the capability information of the at least one relay supporting STA. Here, the beam forming may be performed as described with reference to FIG. 1 or through scanning in units of preset sectors as described with reference to FIG. 2. The destination STA may perform beam forming along with the at least one relay supporting STA and the source STA. The source STA may perform beam forming along with the at least one relay supporting STA and the destination STA.

Further, operation S303 may include transferring a multi-relays channel measurement request frame for requesting channel measurement information according to the beam forming to the destination STA, receiving a multi-relays channel measurement response frame that includes the channel measurement information from the destination STA, and selecting the relay station using the channel measurement information and the capability information. The channel measurement information may include channel measurement information between the source STA and the destination STA, channel measurement information between the at least one relay supporting STA and the destination STA, and internal angle information between a link between the source STA and the destination STA and a link between the destination STA and the at least one relay supporting STA.

In operation S305, the source STA may transfer an RLS request frame to the destination STA. In operation S307, the source STA may receive an RLS response frame that includes relay link setup result information from the destination STA. Here, the RLS request frame and the RLS response frame may pass through the relay STA.

The RLS request frame may include capability information and AID information of the source STA, the relay STA, and the destination STA, and a relay transfer parameter. The relay transfer parameter may include at least one selected from relay method information, cooperative communication use information, transfer mode information according to the cooperative communication use, link switch section information denoting a link switch section, data sensing time information denoting a deferred time caused by link switching, frame exchange section information between the source station and the relay station, and frame exchange section information between the relay station and the destination station.

The relay link setup method according to the embodiment of the present invention may further include transferring the capability information of the source STA to the AP or the PCP. Here, the capability information may include at least one selected from relay support information, relay use information, alternating current (A/C) power use information, mobility information, relay function preference information, relay method information, and cooperative communication support information. The capability information may be included in an association request frame or a probe request frame.

Additionally, the relay link setup method may further include transferring an announcement frame that includes information on success of relay link setup to the AP or the PCP according to the relay link setup result information.

The relay link setup method may further include transferring a relay teardown frame for tearing down the relay link to the relay STA, the destination STA, and the AP or the PCP. Here, the relay teardown frame may include AID information of the source STA, the relay STA, and the destination STA. The relay teardown frame may be transferred to the destination STA by passing through the relay STA.

Figure 4:
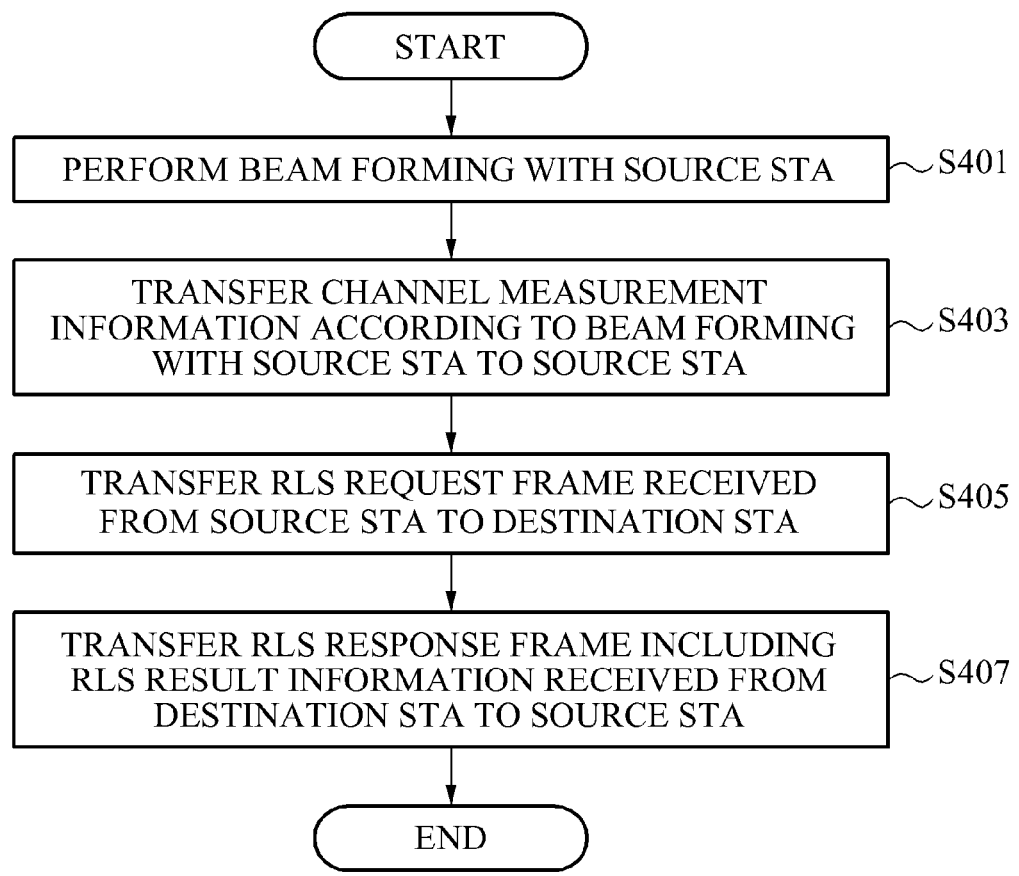
FIG. 4 is a diagram illustrating a relay link setup method of a relay STA in a wireless communication system according to an embodiment of the present invention.

FIG. 4 is a diagram illustrating a relay link setup method of a relay STA in a wireless communication system according to an embodiment of the present invention. As shown in FIG. 4, the relay link setup method may begin from operation S401. The relay STA in FIG. 4 may be the aforementioned relay supporting STA.

In operation S401, the relay STA may perform beam forming along with the source STA. Here, beam forming may be performed in the same manner as described with reference to FIG. 1 or through scanning in units of preset sectors as in FIG. 2. The relay STA may additionally perform beam forming along with the destination STA.

In operation S403, the relay STA may transfer channel measurement information according to the beam forming performed with the source STA. The relay STA may transfer the channel measurement information to the source STA using a multi-relays channel measurement response frame.

In operation S405, the relay STA may receive an RLS request frame from the source STA and transfer the RLS request frame to the destination STA. The RLS request frame may include capability information and AID information of the source STA, the relay STA, and the destination STA, and a relay transfer parameter related to a relay link. The relay transfer parameter may include at least one selected from relay method information, cooperative communication use information, transfer mode information according to the cooperative communication use, link switch section information denoting a link switch section, data sensing time information denoting a deferred time caused by link switching, frame exchange section information between the source station and the relay station, and frame exchange section information between the relay station and the destination station.

In operation S407, the relay STA may receive the RLS response frame that includes relay link setup result information from the destination STA, and transfer the RLS response frame to the source STA. The relay STA may also transfer the RLS response frame that includes the relay link setup result information to the source STA in response to the received RLS request frame.

The relay link setup method may further include transferring the capability information of the relay STA to an AP or a PCP. The capability information may include at least one selected from relay support information, relay use information, A/C power use information, mobility information, relay function preference information, relay method information, and cooperative communication support information.

In addition, the relay link setup method may include receiving a relay teardown frame for tearing down the relay link from the source station, and transferring the relay teardown frame to the destination station. The relay teardown frame may include AID information of the source station, the relay station, and the destination station.

Operation S403 may be omitted from the relay link setup method of the relay STA. The source STA may select the relay STA using the channel measurement information transferred from the destination STA.

Figure 5:
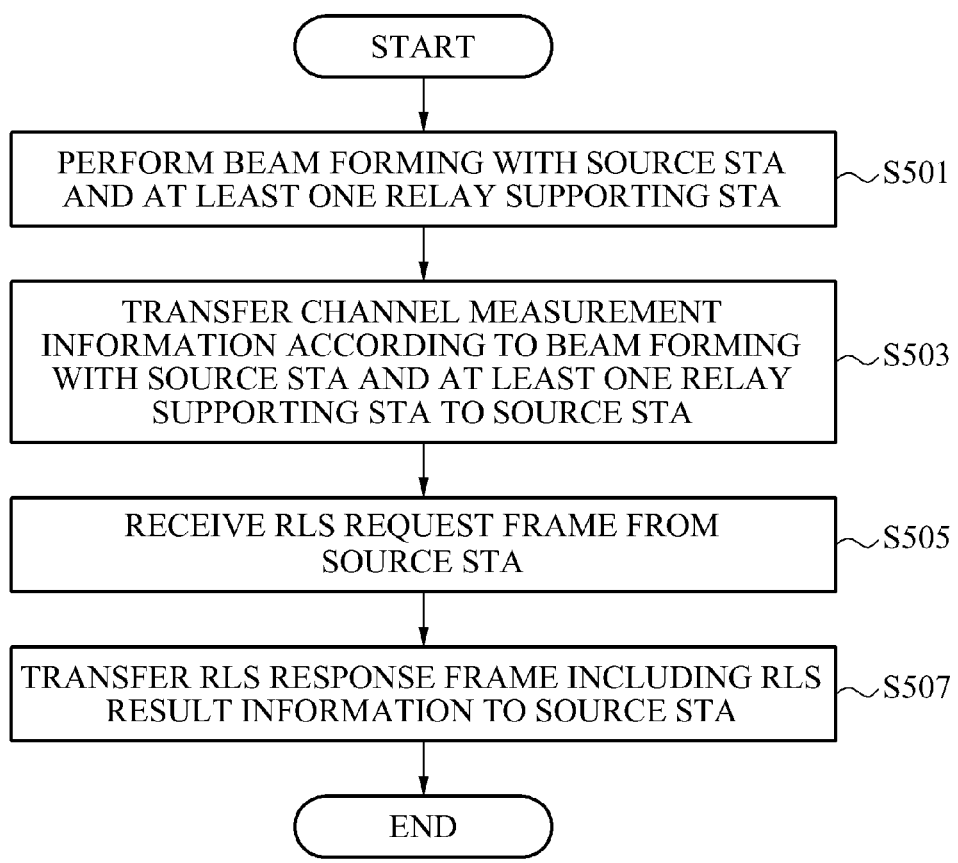
FIG. 5 is a diagram illustrating a relay link setup method of a destination STA in a wireless communication system according to an embodiment of the present invention.

FIG. 5 is a diagram illustrating a relay link setup method of a destination STA in a wireless communication system according to an embodiment of the present invention. As shown in FIG. 5, the relay link setup method begins from operation S501.

In operation S501, the destination STA may perform beam forming along with a source STA and at least one relay supporting STA. The beam forming may be performed in the same manner as in FIG. 1 or through scanning in units of preset sectors as in FIG. 2.

In operation S503, the destination STA may transfer channel measurement information according to the beam forming performed with the source STA and the at least one relay supporting STA, to the source STA. In further detail, operation S503 may include receiving a multi-relays channel measurement request frame for requesting the channel measurement information according to the beam forming from the source STA, and transferring a multi-relays channel measurement response frame that includes the channel measurement information to the source STA. The channel measurement information may include channel measurement information between the source STA and the destination STA, channel measurement information between the at least one relay supporting STA and the destination STA, and internal angle information between a link between the source STA and the destination STA and a link between the destination STA and the at least one relay supporting STA.

In operation S505, the destination STA may receive an RLS request frame from the source STA. The RLS request frame may include capability information and AID information of the source STA, the relay STA, and the destination STA, and a relay transfer parameter. Here, the relay transfer parameter may include at least one selected from relay method information, cooperative communication use information, transfer mode information according to use of the cooperative communication, data sensing time information indicating a deferred time caused by link switching, frame exchange section information between the source STA and the relay STA, and frame exchange section information between the relay STA and the destination STA.

In operation S507, the destination STA may transfer an RLS response frame that includes relay link setup result information to the source STA. The RLS request frame and the RLS response frame may pass through the relay STA selected by the source STA from the at least one relay supporting STA.

The relay link setup method may further include transferring the capability information of the destination STA to an AP or a PCP. The capability information may include at least one selected from relay support information, relay use information, A/C power use information, mobility information, relay function preference information, relay method information, and cooperative communication support information.

In addition, the relay link setup method may further include receiving a relay teardown frame for tearing down the relay link from the source station. The relay teardown frame may include AID information of the source station, the relay station, and the destination station.

Although the embodiments of the present invention have been described in view of a process, each operation constituting the relay link setup method in the wireless communication system may be easily understood in view of an apparatus. Therefore, the operations included in the relay link setup method may be understood as components included in a relay link setup apparatus according to the principle of the present invention.

That is, a relay link setup apparatus according to an embodiment of the present invention may include a first receiving unit to receive capability information of at least one relay supporting STA included in the wireless communication system from an AP or a PCP, a select unit to select one of the at least one relay supporting STA as a relay STA using beam forming information among the source STA, the destination STA, and the at least one relay supporting STA and the capability information, a transfer unit to transfer an RLS request frame to the destination STA, and a second receiving unit to receive an RLS response frame that includes relay link setup result information from the destination STA. The RLS request frame and the RLS response frame may pass through the relay STA. Here, the relay link setup apparatus may be a source STA for performing relay link setup in the wireless communication system.

According to another embodiment, a relay link setup apparatus may include a beam forming unit to perform beam forming along with a source STA, a first transfer unit to transfer channel measurement information according to the beam forming performed with the source STA to the source STA, a second transfer unit to receive an RLS request frame from the source STA and transfer the RLS request frame to the destination STA, and a third transfer unit to receive an RLS response frame that includes relay link setup result information from the destination STA and transfer the RLS response frame to the source STA. Here, the relay link setup apparatus may be a relay STA for performing relay link setup in the wireless communication system.

According to still another embodiment, a relay link setup apparatus may include a beam forming unit to perform beam forming along with a source STA and at least one relay supporting STA, a first transfer unit to transfer channel measurement information according to the beam forming performed with the source STA and the at least one relay supporting STA to the source STA, a receiving unit to receive an RLS request frame from the source STA, and a second transfer unit to transfer an RLS response frame that includes relay link setup result information to the source STA. The RLS request frame and the RLS response frame may pass through the relay STA selected by the source STA from the at least one relay supporting STA. Here, the relay link setup apparatus may be a destination STA for performing relay link setup in the wireless communication system.

The relay link setup method according to the foregoing embodiments may be embodied by a computer program. A code and a code segment constructing the program may be easily inferred by a computer programmer having skill in the art. In addition, the program is recorded in a non-transitory computer-readable recording media, that is, data storage media, and read and executed by the computer, thereby implementing the method. In addition, the recording media may include any type of computer-readable recording media, that is, not only tangible media such as CDs and DVDs but also intangible media such as carrier waves.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A relay link setup method of a source station in a wireless communication system, the method comprising:
  receiving capability information of at least one relay supporting station included in the wireless communication system from an access point (AP) or a personal basic service set (PBSS) central point (PCP);
  selecting one of the at least one relay supporting station as a relay station, using channel measurement information among the source station, a destination station, and the at least one relay supporting station and the capability information;
  transferring a relay link setup request frame to the destination station; and
  receiving a relay link setup response frame that includes information on a relay link setup result from the destination station,
  wherein the relay link setup request frame and the relay link setup response frame pass through the relay station, and
  wherein the channel measurement information comprises internal angle information between a link between the source station and the destination station and a link between the destination station and the at least one relay supporting station.

2. The relay link setup method of claim 1, further comprising transferring capability information of the source station to the AP or the PCP,
  wherein the capability information comprises at least one selected from relay support information, relay use information, alternating current (A/C) power use information, relay function preference information, relay method information, and cooperative communication support information.

3. The relay link setup method of claim 1, wherein the receiving of the capability information of the at least one relay supporting station comprises:
  transferring a relay search request frame for requesting the capability information of the at least one relay supporting station to the AP or the PCP; and
  receiving a relay search response frame that includes the capability information of the at least one relay supporting station from the AP or the PCP.

4. The relay link setup method of claim 1, wherein the channel measurement information is obtained through scanning in units of preset sectors.

5. The relay link setup method of claim 4, wherein
  the destination station performs beam forming along with the at least one relay supporting station and the source station, and
  the selecting of one of the at least one relay supporting station as the relay station comprises:

transferring a multi-relays channel measurement request frame for requesting channel measurement information according to the beam forming to the destination station;

receiving a multi-relays channel measurement response frame that includes the channel measurement information from the destination station; and selecting the relay station using the channel measurement information and the capability information.

6. The relay link setup method of claim 5, wherein the channel measurement information further comprises:

channel measurement information between the source station and the destination station; and channel measurement information between the at least one relay supporting station and the destination station.

7. The relay link setup method of claim 1, wherein the relay link setup request frame comprises capability information of the source station, the relay station, and the destination station, association identifier (AID) information, and a relay transfer parameter, wherein the relay transfer parameter comprises at least one selected from relay method information, cooperative communication use information, transfer mode information according to the cooperative communication use, link switch section information denoting a link switch section, data sensing time information denoting a deferred time caused by link switching, frame exchange section information between the source station and the relay station, and frame exchange section information between the relay station and the destination station.

8. The relay link setup method of claim 1, further comprising transferring an announcement frame that includes information on success of relay link setup to the AP or the PCP according to the information on the relay link setup result.

9. The relay link setup method of claim 1, further comprising transferring a relay teardown frame for tearing down a relay link to the relay station, the destination station, and the AP or the PCP, wherein the relay teardown frame comprises AID information of the source station, the relay station, and the destination station.

10. A relay link setup method of a relay station in a wireless communication system, the method comprising:

performing beam forming along with a source station;

transferring, to the source station, channel measurement information according to the beam forming with the source station;

transferring capability information of the relay station to an access point (AP) or a personal basic service set (PBSS) central point (PCP);

receiving a relay link setup request frame from the source station and transferring the relay link setup request frame to the destination station; and receiving a relay link setup response frame that includes information on a relay link setup result from the destination station and transferring the relay link setup response frame to the source station, wherein the channel measurement information comprises internal angle information between a link between the source station and the destination station and a link between the destination station and the relay station.

11. The relay link setup method of claim 10, wherein the capability information comprises at least one selected from relay support information, relay use information, alternating current (A/C) power use information, relay function preference information, relay method information, and cooperative communication support information.

12. The relay link setup method of claim 10, wherein the performing of beam forming along with the source station comprises performing beam forming through scanning in units of preset sectors.

13. The relay link setup method of claim 10, wherein the relay link setup request frame comprises capability information and association identifier (AID) information of the source station, the relay station, and the destination station, and a relay transfer parameter related to a relay link, wherein the relay transfer parameter comprises at least one selected from relay method information, cooperative communication use information, transfer mode information according to the cooperative communication use, link switch section information denoting a link switch section, data sensing time information denoting a deferred time caused by link switching, frame exchange section information between the source station and the relay station, and frame exchange section information between the relay station and the destination station.

14. The relay link setup method of claim 10, further comprising:

receiving a relay teardown frame for tearing down a relay link from the source station; and transferring the relay teardown frame to the destination station, wherein the relay teardown frame comprises AID information of the source station, the relay station, and the destination station.

15. A relay link setup method of a destination station in a wireless communication system, the method comprising:

performing beam forming along with a source station and at least one relay supporting station;

transferring capability information of the destination station to an access point (AP) or a personal basic service set (PBSS) central point (PCP);

transferring channel measurement information according to the beam forming with the source station and the at least one relay supporting station to the source station;

receiving a relay link setup request frame from the source station; and transferring a relay link setup response frame that includes information on a relay link setup result to the source station, wherein the relay link setup request frame and the relay link setup response frame pass through a relay station selected by the source station from the at least one relay supporting station, and wherein the channel measurement information comprises internal angle information between a link between the source station and the destination station and a link between the destination station and the at least one relay supporting station.

16. The relay link setup method of claim 15, wherein the capability information comprises at least one selected from relay support information, relay use information, alternating current (A/C) power use information, relay function preference information, relay method information, and cooperative communication support information.

17. The relay link setup method of claim 15, wherein the performing of beam forming comprises performing beam forming through scanning in units of preset sectors.

18. The relay link setup method of claim 15, wherein the transferring of the channel measurement information to the source station comprises:

receiving, from the source station, a multi-relays channel measurement request frame for requesting channel measurement information according to the beam forming; and transferring a multi-relays channel measurement response frame that includes the channel measurement information to the source station, wherein the channel measurement information further comprises:

channel measurement information between the source station and at least one relay supporting station; and channel measurement information between the at least one relay supporting station and the destination station.

19. The relay link setup method of claim 15, wherein the relay link setup request frame comprises capability information and association identifier (AID) information of the source station, the relay station, and the destination station, and a relay transfer parameter, wherein the relay transfer parameter comprises at least one selected from relay method information, cooperative communication use information, transfer mode information according to the cooperative communication use, link switch section information denoting a link switch section, data sensing time information denoting a deferred time caused by link switching, frame exchange section information between the source station and the relay station, and frame exchange section information between the relay station and the destination station.

20. The relay link setup method of claim 15, further comprising receiving a relay teardown frame for tearing down a relay link from the source station, wherein the relay teardown frame comprises AID information of the source station, the relay station, and the destination station.

* * * * *